United States Patent
Koshikawa

(10) Patent No.: US 6,543,088 B2
(45) Date of Patent: Apr. 8, 2003

(54) HINGE ASSEMBLY

(75) Inventor: Shinichiro Koshikawa, Yokaichiba (JP)

(73) Assignee: Sugatsune Kogyo Co., Ltd. (JP)

( * ) Notice: Subject to any disclaimer, the term of this patent is extended or adjusted under 35 U.S.C. 154(b) by 0 days.

(21) Appl. No.: 09/740,608

(22) Filed: Dec. 19, 2000

(65) Prior Publication Data

US 2001/0004786 A1 Jun. 28, 2001

(30) Foreign Application Priority Data

Dec. 28, 1999 (JP) .............................................. 11-372566

(51) Int. Cl.$^7$ .............................. E05F 1/08; H04M 1/03
(52) U.S. Cl. .................................... 16/303; 379/433.13
(58) Field of Search .......................... 16/257, 262, 268, 16/342, 232, 303; 455/575, 90; 361/610, 680, 681; 379/433.13

(56) References Cited

U.S. PATENT DOCUMENTS

| | | | |
|---|---|---|---|
| 2,734,223 A | * 2/1956 | Park | 16/381 |
| 4,847,950 A | * 7/1989 | Coleman | 16/257 |
| 5,448,781 A | * 9/1995 | Miller | 16/257 |
| 5,881,150 A | * 3/1999 | Persson | 16/247 |
| 6,345,097 B1 | * 2/2002 | Chintala et al. | 455/90 |

FOREIGN PATENT DOCUMENTS

| | | |
|---|---|---|
| JP | 7-11831 | 1/1995 |
| JP | 10-317779 | 12/1998 |

* cited by examiner

*Primary Examiner*—Anthony Knight
*Assistant Examiner*—D Hutton
(74) *Attorney, Agent, or Firm*—Eugene Stephens & Associates

(57) ABSTRACT

A bottom portion 11a is formed on an external end portion of a support sleeve portion 11 which is located on an external side, and an engagement recess 43 is formed in an inner peripheral surface of a support sleeve portion 21 which is located on an internal side. That end face of the engagement recess 43 which faces the support sleeve portion 11 side serves as an engagement surface 44. An engagement piece 45 is formed on one end portion of a hinge body 3. The engagement piece 45 is elastically deformed such that its distal end portion is displaced radially inward of the hinge body 3, thereby the engagement piece 45 is allowed to extend beyond a bottom surface of a key groove 41. Thereafter, the engagement body 45 is elastically restored such that its distal end portion is displaced radially outward of the hinge body 3, thereby the engagement piece 45 is engaged with the engagement recess 43. Then, the engagement piece 45, when abutted with the engagement surface 44 at its distal end face, prohibits the hinge body 3 from escaping from the support sleeve portion 21.

3 Claims, 7 Drawing Sheets (A)

(B)

(C)

HINGE ASSEMBLY

BACKGROUND OF THE INVENTION

This invention relates to a hinge assembly for rotatably connecting a device main body of a cellular telephone, a notebook type personal computer, etc., and a rotating body for opening and closing the device main body with respect to each other.

In general, a hinge assembly of this type comprises one pair of support sleeve portions which are disposed at a device main body and a rotating body and a hinge body. One and the other ends of the hinge body are inserted into the support sleeve portion of the device main body and support sleeve portion of the rotating body respectively. By this, the device main body and the rotating body are pivotably connected to each other.

For inserting the hinge body into the support sleeve portions, first, the axis of the support sleeve portion of the device body is aligned with the axis of the support sleeve portion of the rotating body. Then, the hinge body is inserted from one of the support sleeve portions. Thereafter, one end portion of the hinge body is inserted all the way into the other support sleeve portion from one of the support sleeve portion.

In the case the hinge body is inserted into the support sleeve portions in this way, the hinge body can escape from the support sleeve portions. Therefore, in order to prevent the hinge body from escaping from the support sleeve portions, a bottom portion is formed at one end portion of one of the support sleeve portions and a shaft portion extending through the bottom portion is formed on that end portion of the hinge body which faces the bottom portion. A stopper member such as a stop ring is fitted to a distal end portion of a shaft portion which projects outward from the support sleeve portions via the bottom portion. By doing so, the hinge body is prevented from escaping from the support sleeve portions.

In the case where the hinge body is prevented from escaping in the manner as mentioned above, it is indispensable to provide a stopper member and in addition, a process for attaching the stopper member becomes necessary. For this reason, the number of components and the labor for manufacturing thereof are increased, thus resulting in higher manufacturing cost. Moreover, in order to arrange such that the shaft portion extending through the bottom portion and the stopper member are not seen from outside, the bottom portion is formed at the internal end portion of the firstmentioned support sleeve portion and this support sleeve portion is arranged at an internal side of the other support sleeve portion. However, this arrangement has such a shortcoming that the external opening portion of the other support sleeve portion into which the hinge body is inserted is exposed outside. Thus, it becomes necessary to cover the opening portion with a decorative cover or the like. This again makes it necessary to correspondingly increase the number of components and to increase the process for attaching the decorative cover or the like, thus resulting in much higher manufacturing cost. Moreover, even if the opening portion of the other support sleeve portion is covered with a decorative cover, there still remains a line indicating a border between the decorative cover and the support sleeve portion. This degrades the outlook of the hinge assembly.

SUMMARY OF THE INVENTION

The present invention has been accomplished in order to solve the above problems. The feature of the present invention resides in a hinge assembly comprising a pair of support sleeve portions disposed at a device main body and a rotating body respectively with axes thereof aligned and a hinge body, one and the other end portions of the hinge body being inserted into the pair of support sleeve portions respectively, thereby pivotably connecting the device main body and the rotating body together, the hinge assembly further comprising an engagement mechanism disposed between an inner peripheral surface of one of the pair of support sleeve portions (this support portion will be hereinafter referred to as the first support sleeve portion and the other as the second support sleeve portion) and the hinge body and adapted to prohibit the hinge body from escaping at least in one direction from the first support sleeve portion.

In the above arrangement, it is preferred that the engagement mechanism includes an engagement recess portion formed in the inner peripheral surface of the first support sleeve portion and an engagement portion displaceably disposed at the hinge body in a radial direction thereof, the engagement portion being displaced radially outward so as to be engaged with the engagement recess portion, the engagement portion, when abutted with that side surface of the engagement recess portion which faces in an axial direction of the first support sleeve portion, prohibiting the hinge body from escaping in one direction from the first support sleeve portion. Particularly preferably, the engagement portion is composed of a totally elastically deformable engagement piece, such that a basal end portion of the engagement portion is integral with the hinge body and a distal end portion thereof is displaceable in a radial direction of the hinge body.

It is also preferred that selected one of the first and second support sleeve portions has a closed end (bottom portion) and an open end, while the remaining support sleeve portion has both open ends, and the engagement mechanism prohibits the hinge body from escaping from the selected support sleeve portion towards the remaining support sleeve portion. Particularly preferably, two of the selected support sleeve portions are disposed with axes thereof aligned and two of the remaining support sleeve portions are also disposed with axes thereof aligned, the two selected support sleeve portions being arranged away from each other in an axial direction with bottom portions thereof located at an external side thereof and the two remaining support sleeve portions being arranged away from each other in an axial direction and adjacent to an internal side of the two selected support sleeve portions, two of the hinge bodies being inserted into each of the mutually adjacent two sets of support sleeve portions.

It is also accepted that the device body and the rotating body are a telephone main body and a cover body of a cellular telephone, respectively.

BRIEF DESCRIPTION OF THE DRAWINGS

FIG. 9(A) is a front view thereof, FIG. 9(B) is a front sectional view thereof, FIG. 9(C) is a plan view thereof, FIG. 9(D) is a left side view thereof and FIG. 9(E) is a right side view thereof;

FIG. 10(A) is a front view thereof, FIG. 10(B) is a front sectional view thereof, FIG. 10(C) is a plan view thereof, FIG. 10(D) is a plan sectional view thereof, FIG. 10(E) is a left side view thereof and FIG. 10(F) is a right side view thereof;

FIG. 11(A) is a left side view thereof, FIG. 11(B) is a front view thereof and FIG. 11(C) is a right side view thereof;

DETAILED DESCRIPTION OF THE INVENTION

One embodiment of the present invention will now be described with reference to FIGS. 1 to 13.

Figure 3:
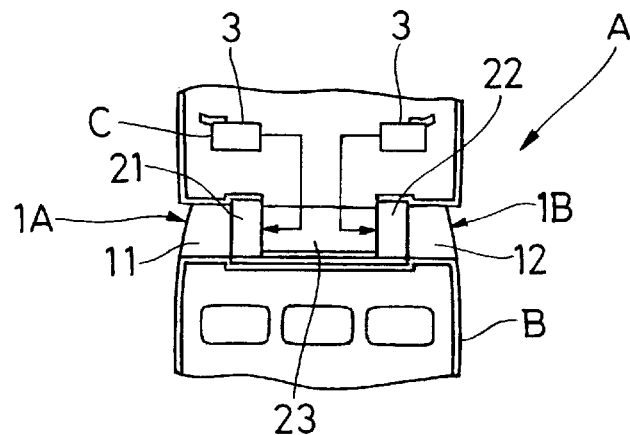
FIG. 3 is a view showing a telephone main body, a part of a cover body and a hinge body of the above embodiment, the cover body being in an open position.

FIG. 3 shows a cellular telephone A incorporated with the present invention. This cellular telephone A includes a telephone main body (device main body) B and a cover body (rotating body) C. The telephone main body B and the cover body C are pivotably connected to each other through a pair of left and right hinge assemblies 1A, 1B.

Figure 4:
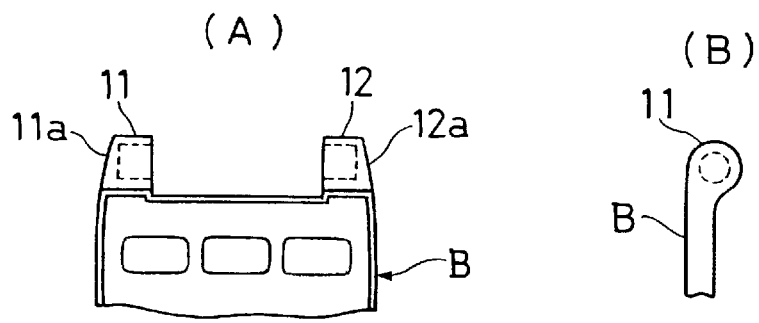
FIG. 4 is a view showing a part of a telephone main body of the above embodiment.

The hinge assemblies 1A, 1B are constructed in the following manner. As shown in FIGS. 3 and 4, a telephone main body B has one pair of support sleeve portions 11, 12 formed on one end portion (that end portion which is located on the side of the cover body C) thereof. The pair of support sleeves 11, 12 are arranged away from each other in an axial direction with axes thereof aligned. The support sleeve portions 11, 12 are open at inner end portions thereof but closed with bottom portions 11a, 12a at outer end portions thereof, respectively.

Figure 5:
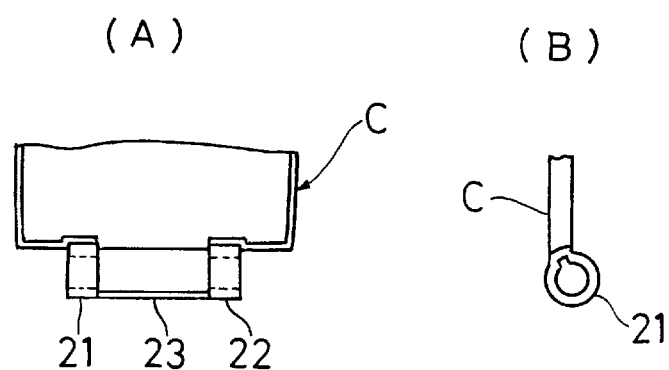
FIG. 5 is a view showing a part of the cover body of the above embodiment.

As shown in FIGS. 3 and 5, the cover body C has one pair of support sleeve portions 21, 22 formed on that end thereof which is located on the side of the telephone main body B. The pair of support sleeve portions 21, 22 have a same inside and outside diameter as the support sleeve portions 11, 12, and they are arranged away from each other in an axial direction with axes thereof aligned. Moreover, the pair of support portions 21, 22 are such dimensioned as to have a same external interval as an internal interval of the pair of support sleeve portions 11, 22 so that they can enter between the support sleeve portions 11, 12. Accordingly, the support sleeve portion 21 is adjacent to the support sleeve portion 11 at its internal side, while the other support sleeve portion 22 is adjacent to the support sleeve portion 12 at its internal side. Between the pair of support sleeve portions 21 and 22, a connecting portion 23 is formed. The connecting portion 23 has a semi-circular sleeve like configuration. The outside and inside diameters of this connecting portion 23 are same as those of the support sleeve portions 21, 22. Opposite end portions of the connecting portion 23 are connected to the support sleeve portions 21, 22, respectively.

Both end portions (i.e., one and the other end portions) of two hinge bodies 3, 3 are inserted in the mutually adjacent support sleeve portions 11, 21; 12, 22, respectively. The support sleeve portions 11, 21; 12, 22 are pivotably connected to each other through the hinge bodies 3, 3, respectively. Thus, the telephone main body B and the cover body C are pivotably connected to each other. The hinge assembly 1A is composed of the support sleeve portions 11, 21 and the hinge body 3, while the hinge assembly 1B is composed of the support sleeve portions 12, 22 and the hinge body 3.

The hinge body 3 of the hinge assembly 1A is prohibited from escaping from the support sleeve portion 21 side towards the support sleeve portion 11 side by the bottom portion 11a. It is also prohibited from escaping from the support sleeve portion 11 side towards the support sleeve portion 21 side by an engagement mechanism 4 to be described hereinafter. The hinge body 3 of the hinge assembly 1B is prohibited from escaping in a direction towards the support sleeve portion 12 side from the support sleeve portion 22 side by the bottom portion 12a, and it is also prohibited from escaping in a direction towards the support sleeve portion 22 side from the support sleeve portion 12 side by an engagement mechanism (not shown). The engagement mechanism of the hinge assembly 1B is laterally symmetrical with the engagement mechanism 4. Therefore, only the engagement mechanisms 4 of the hinge assembly 1A will be described hereinafter.

Figure 1:
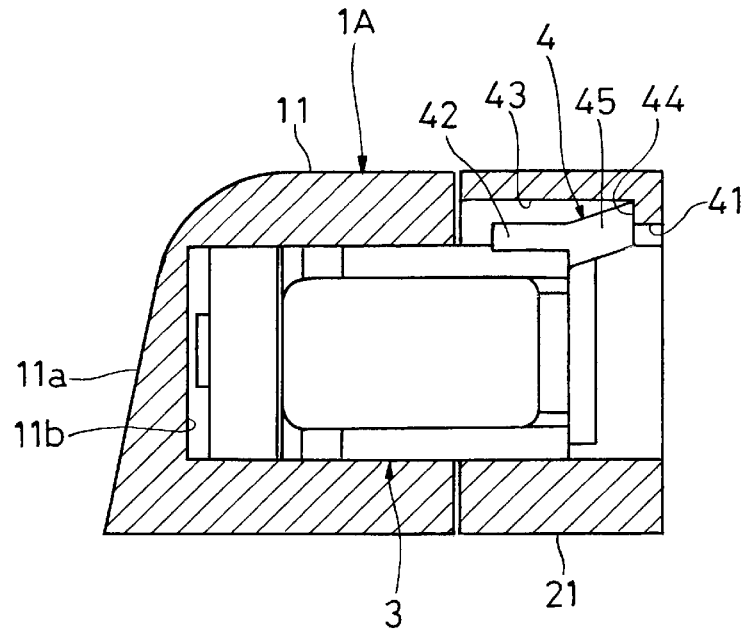
FIG. 1 is a sectional view showing one embodiment of the present invention.
Figure 2:
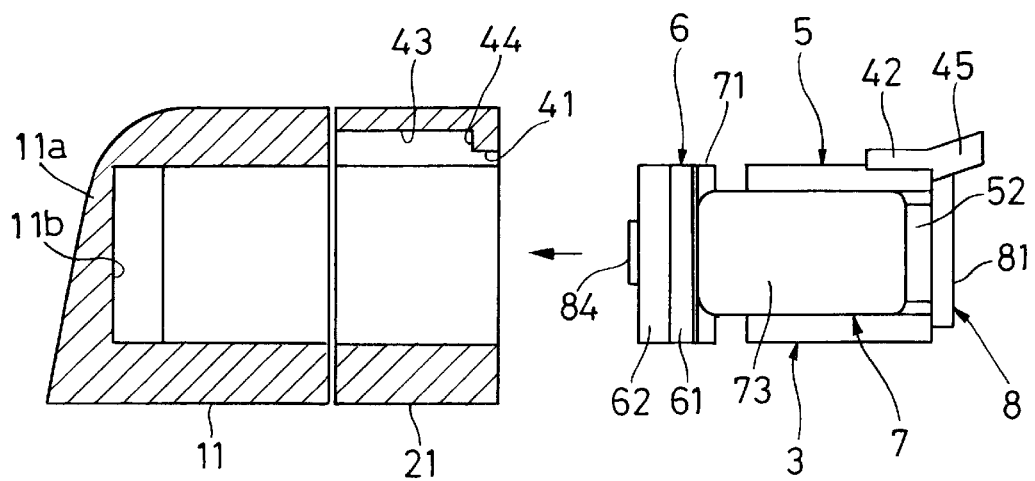
FIG. 2 is a view showing two support sleeve portions of the above embodiment and a hinge body before inserted into the two support sleeve portions.

As shown in FIGS. 1 and 2, the support sleeve portion 21 has a key groove 41 formed in its inner peripheral surface and extending from its one end to the other end along its axis. On the other hand, a key portion 42 is formed on an outer peripheral surface of the hinge body 3. This key portion 42 is brought into engagement with the key groove 41 so that the other end portion of the hinge body 3 is non-rotatably connected to the support sleeve portion 21.

The key groove 41 has an engagement recess 43 formed in its bottom surface and extending along the key groove 41. The engagement recess 43 has a same width as the key groove 41. That end portion of the engagement recess 43 which is located on the side of the support sleeve portion 11 is open and the other end portion is closed. An end face of the closed end portion serves as an engagement surface 44 which faces the support sleeve portion 11 side in the axial direction of the support sleeve portion 21. That end portion of the engagement recess 43 which is located on the side of the support sleeve portion 11 may be closed.

That end portion of the key portion 42 located away from the support sleeve portion 11 is integrally formed with the engagement piece 45. This engagement piece 45 has a same width as the key portion 42 and arranged at a same location as the key portion 42 in a circumferential direction of the hinge body 3. The engagement piece 45 is inclined such that it is directed outward in a radial direction of the hinge body 3 as it goes away from support sleeve portion 11. The height of the engagement piece 45 (the height from the outer peripheral surface of the hinge body 3 to the distal end of the engagement piece 45) is generally same or slightly larger than the depth of the engagement recess 43 (the depth from the inner peripheral surface of the support sleeve portion 21). A distal end face of the engagement piece 45 is arranged such that it is confronted with the engagement surface 44 when the hinge body 3 is inserted all the way to the support sleeve portion 11 from the support sleeve portion 21 until its distal end portion generally contacts the bottom portion 11a. Moreover, the engagement piece 45 is totally elastically deformable so that its distal end portion can be displaced in a radial direction of the hinge body 3. Owing to this arrangement, when the hinge body 3 is inserted from the support sleeve portion 21, the engagement piece 45 contacts the bottom surface of the key groove 42 and it is elastically deformed inward in a radial direction of the hinge body 3 as the hinge body 3 is inserted. When the distal end of the engagement piece 45 reaches the engagement recess 43, the engagement piece 45 is elastically restored outward in the radial direction of the hinge body 3 and brought into the engagement recess 43. In the state in which the engagement piece 45 is brought into the engagement recess 43, the distal end face of the engagement piece 45 hits the engagement surface 44 when the hinge body 3 attempts to escape from the support sleeve portion 11 side towards the support sleeve portion 21 side. By this, the hinge body 3 is prohibited from escaping from the support sleeve portion 21.

In the case where the telephone main body B and the cover body C are connected to each other through the hinge assemblies 1A, 1B, as shown in FIG. 3, the support sleeve portions 21, 22 are brought between the support sleeve portions 11 and 12. Then, the axes of the support sleeve portions 11, 12, 21, 22 are all aligned. Subsequently, the hinge body 3 is inserted all the way to the support sleeve portion 11 from the connecting portion 23 side via the support sleeve portion 21. Of course, in that case, the hinge body 3 is inserted into the support sleeve portions 21, 11 in order first with the side opposite to the side on which the key portion 42 and the engagement piece 45 are disposed. The other hinge body 3 is likewise inserted into the support sleeve portions 22, 12 in order from the connecting portion 23 side. When the hinge body 3 is inserted until its distal end generally contacts the bottom portion 11a (12a), the engagement piece 45 is brought into the engagement recess 43 and engaged with the engagement surface 44. By this, the hinge body 3 is prohibited from escaping from the support sleeve portion 11 (12) side to the support sleeve portion 21 (22) side. Moreover, the telephone main body B and the cover body C are pivotably connected to each other through the hinge assemblies 1A, 1B.

As seen, in the hinge assemblies 1A, 1B, it is good enough that the hinge body 3 is merely inserted into the support sleeve portions 11, 21; 12, 22, and it is not necessary that the hinge body 3 is prevented from escaping by a stop ring or the like. Therefore, the number of components and the labor can be correspondingly reduced. Moreover, since the external end portions of the support sleeve portions 11, 12 which are arranged outside are closed with the bottom portions 11a, 12a respectively, there is no need to use a decorative cover. Therefore, the number of components can be reduced correspondingly and the labor for attaching the decorative cover can be omitted. Thus, the manufacturing cost of the hinge assemblies 1A, 1B can be reduced. Moreover, since no decorative cover is used and the external end portions of the support sleeve portions 11, 12 are not closed with the bottom portions 11a, 12a respectively, a line indicating a border between the decorative cover and the support sleeve portions 11, 12 does not appear to the outside of the support sleeve portions 11, 12. Therefore, the outlook can be improved. Although the internal opening portions of the support sleeve portions 21, 22 are left open, no problem arises because they are not visually recognized from outside in a state in which the telephone main body B is closed with the cover body C.

Figure 6:
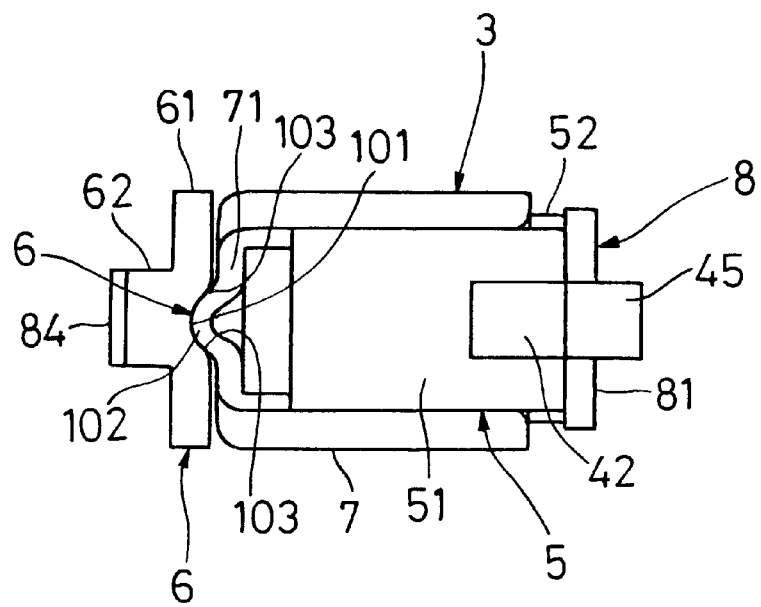
FIG. 6 is a plan view showing a hinge body of the above embodiment.
Figure 7:
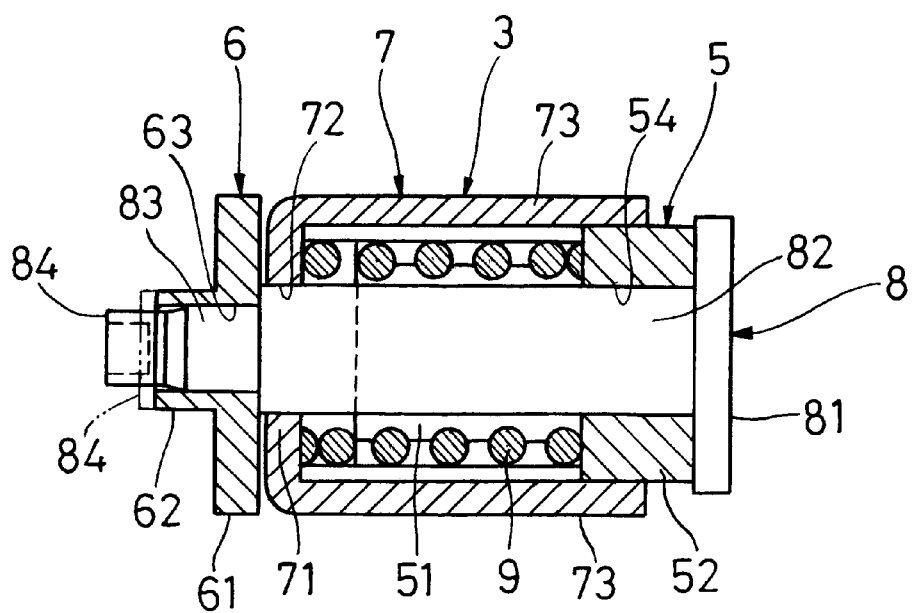
FIG. 7 is a plan sectional view of the above hinge body.
Figure 8:
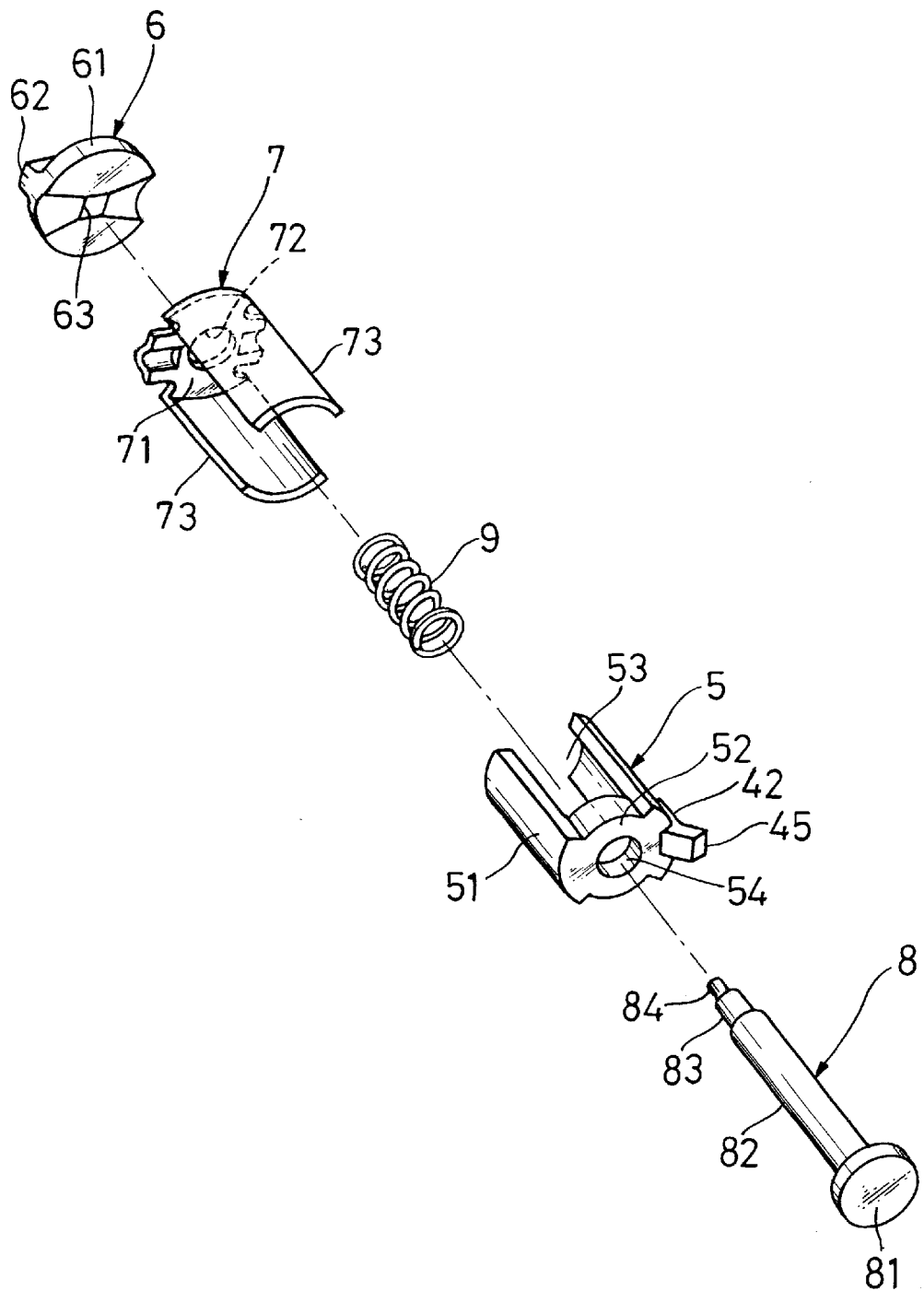
FIG. 8 is an exploded perspective view showing the above hinge body.
Figure 9:
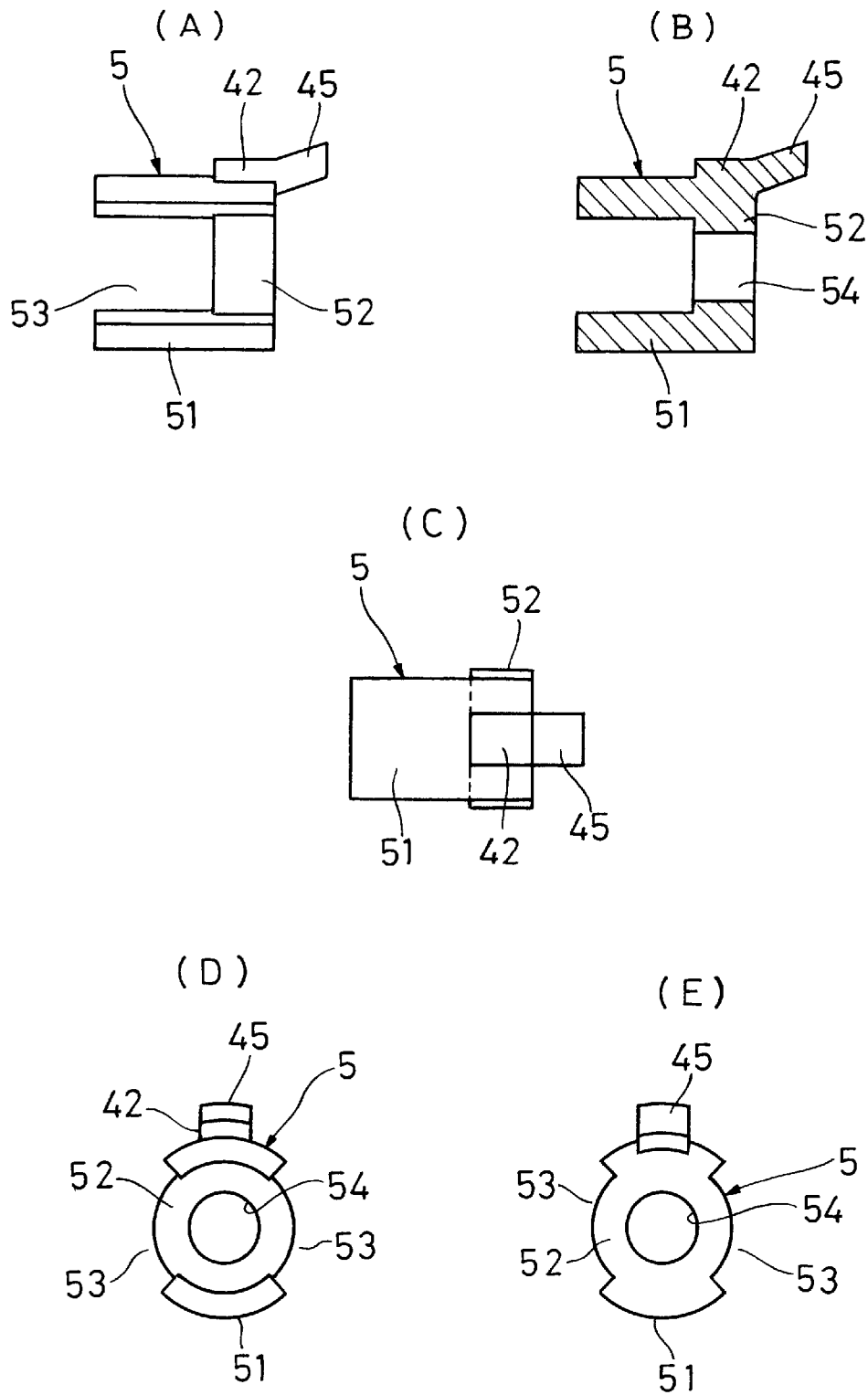
FIG. 9 is a view showing one hinge member of the above hinge body.
Figure 10:
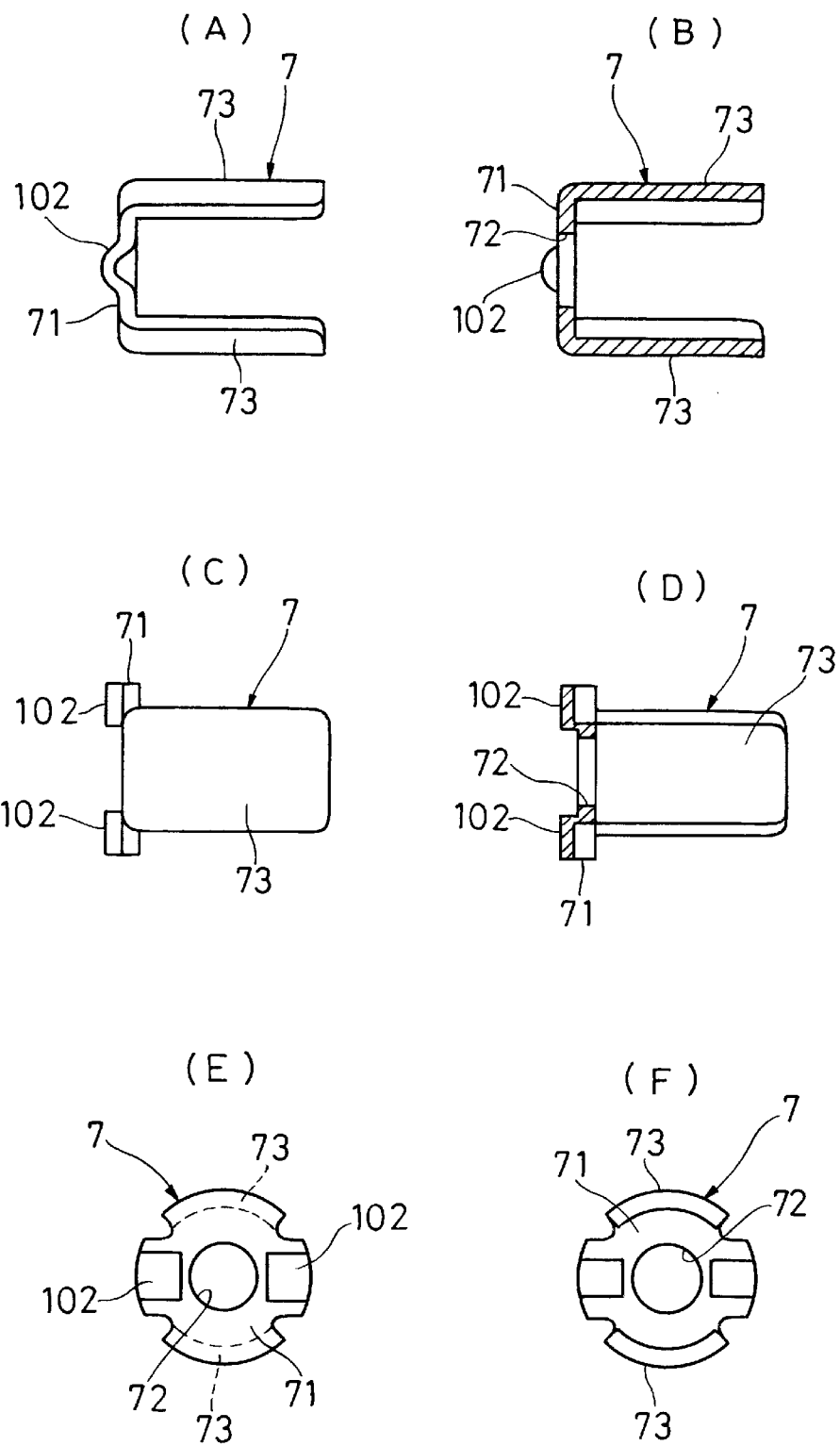
FIG. 10 is a view showing a movable member of the above hinge body.

Next, a detailed construction of the hinge body 3 will be described taking an example of the hinge assembly 1A. As shown in FIGS. 6 to 8, the hinge body 3 is chiefly composed of one pair of hinge members 5, 6, a movable member 7 and a connecting shaft 8 for connecting them.

The hinge member 5 is inserted into the support sleeve portion 21. It has a circular sleeve portion 51 as shown in FIGS. 6 to 9. This circular sleeve portion 51 has a generally same outside diameter as an inside diameter of the support sleeve portion 11. One end (this end will be hereinafter referred to as the front end and the other end as the rear end) of the circular sleeve portion 51 on the support sleeve portion 11 side is open and the rear end portion is formed with a bottom portion 52. The circular sleeve portion 51 has the key portion 42 formed on an outer peripheral surface of the rear end portion. It also has the engagement piece 45 formed thereon backward from the key portion 42. Accordingly, the hinge member 5 is non-pivotably inserted into the support sleeve portion 21 and pivoted in unison with the cover body C. One pair of guide grooves 53, 53 are spacedly formed on the circular sleeve portion 51 at an interval of 180 degrees in a circumferential direction the portion 51 and extend from a front end face to a rear end face of the circular sleeve portion 51. Owing to a provision of the guide grooves 53, 53, a peripheral wall of the circular sleeve portion 51 is divided into two parts. A support hole 54 is formed in a central portion of the bottom portion 52. The connecting shaft 8 is rotatably inserted into the support hole 54.

The other hinge member 6 is inserted into the support sleeve portion 11. It includes a disc portion 61 having a generally same outside diameter as an inside diameter of the support sleeve portion 11 as shown in FIGS. 6 to 8 and 11. A key portion 62 is formed at that end face of the disc portion 61 on the bottom portion 11a side. The key portion 62 extends along the radial line in such a manner as to traverse the end face of the bottom portion 11a. A key groove 11b corresponding to the key portion 62 is formed in the bottom portion 11a (see FIGS. 1 and 2). By inserting the key portion 62 into the key groove 11b, the hinge member 6 is non-pivotally connected to the support sleeve portion 11 and allowed to pivot in unison with the telephone main body B. The hinge member 6 includes a connecting hole 63 having a generally square configuration in section and extending from a central portion of one end face of the disc portion 61 to the key portion 62.

As shown in FIGS. 6 to 8, the connecting shaft 8 includes a disc-like head portion 81, a main shaft portion 82 integrally formed on a central portion of one end face of the head portion 81 and having a circular configuration in section, a stationary shaft portion 83 formed on a central portion of a front end face of the main shaft portion 82 and having a generally square configuration in section and a caulking part 84 formed on a distal end face of the stationary shaft portion 83, which are all coaxially arranged. That end portion of the main shaft portion 82 which is located on the head portion 81 side is relatively pivotably inserted into the support hole 54 of the hinge member 5. The stationary shaft portion 83 is non-pivotably inserted into the connecting hole 63 of the hinge member 6. After the stationary shaft portion 83 is inserted into the connecting hole 63, the caulking part 84 is caulked. By doing so, the hinge member 6 is urged against a distal end face of the main shaft portion 82 and fixed to the stationary shaft portion 83 in that condition. Accordingly, the pair of hinge members 5, 6 are pivotably connected to each other through the connecting shaft 8, and when the telephone main body B and the cover body C are relatively pivoted, the hinge members 5, 6 are also relatively pivoted.

As shown in FIGS. 6 to 8 and 10, the movable member 7 includes a circular end plate portion 71 at that end portion thereof which is located on the hinge member 6 side. A through-hole 72 is formed in a central portion of the end plate portion 71. The main shaft portion 82 of the connecting shaft 8 is relatively pivotably and slidingly movably inserted into the through-hole 72. One pair of guide arms 73, 73 are spacedly arranged on the end plate portion 71 at an interval of 180 degrees in a circumferential direction and allowed to extend towards the hinge member 5. Outside diameters of the end plate portion 71 and the guide arms 73, 73 are generally same as an inside diameter of the support sleeve portion 11. They are pivotably and slidingly movably disposed at the support sleeve portion 11. The guide arms 73, 73 are slidingly movably engaged with the guide grooves 53, 53 of the hinge body 5. Accordingly, the movable member 7 is movable in a longitudinal direction of the guide groove 53 (axial direction of the support sleeve portions 11, 21) but non-pivotable with respect to the hinge member 5, and movable in the axial direction of the support sleeve portions 11, 21 and pivotable with respect to the hinge member 6.

A coiled spring (biasing means) 9 is externally attached to the main shaft portion 82 of the connecting shaft 8. One end portion of the coiled spring 9 hits the bottom portion 52 of the hinge member 5 and the other end hits the end plate portion 71 of the movable member 7. By this, this coiled spring 9 urges the bottom portion 52 of the hinge member 5 against the head portion 81 of the connecting shaft 8 and the end plate portion 71 of the movable member 7 against the disc portion 61 of the hinge member 6.

As shown in FIG. 6, an engagement mechanism 100 is disposed between contact surfaces of the disc portions 61 and the end plate portion 71. By biasing force of the coiled spring 9, the engagement mechanism 100 is caused to hold the cover body C in a predetermined pivotal position with respect to the telephone main body B. It has both functions, one function for holding the telephone main body B and the cover body C in an assembling position at the time of assembling them and the other function for holding the cover body C in a closed position where the cover body C hits the telephone main body B to cover the front surface of the telephone main body B and in an open position pivoted a predetermined angle (for example, about 160 degrees) away from the closed position.

Figure 11:
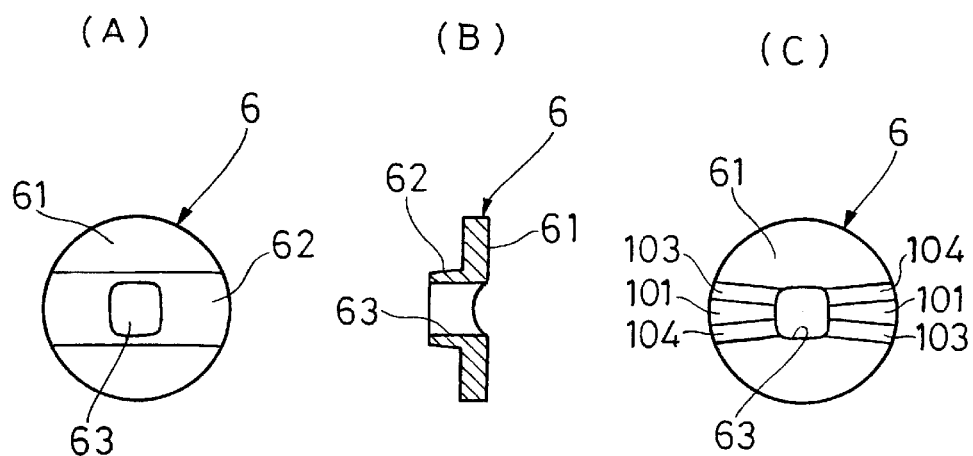
FIG. 11 is a view for showing the other hinge member of the above hinge body.
Figure 12:
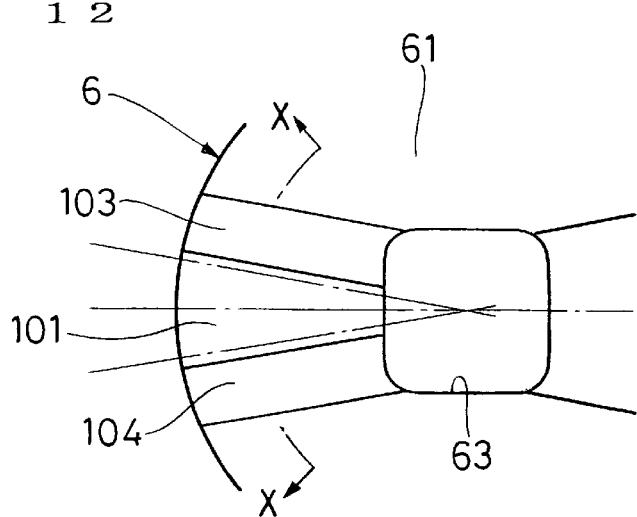
FIG. 12 is a left side view showing a part of the other hinge member on an enlarged basis.
Figure 13:
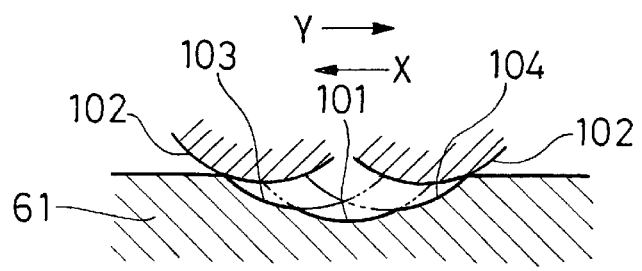
FIG. 13 is a sectional view taken on line X—X of FIG. 12.
Figure 6:
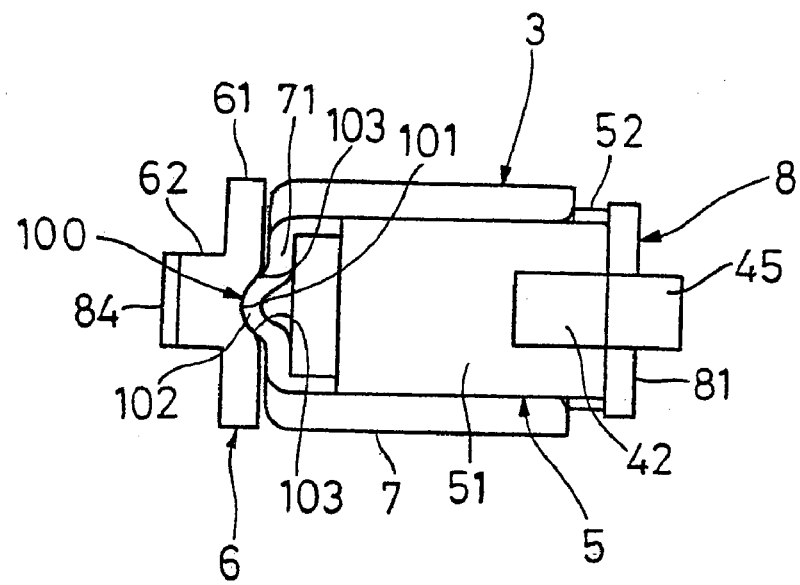
Figure 7:
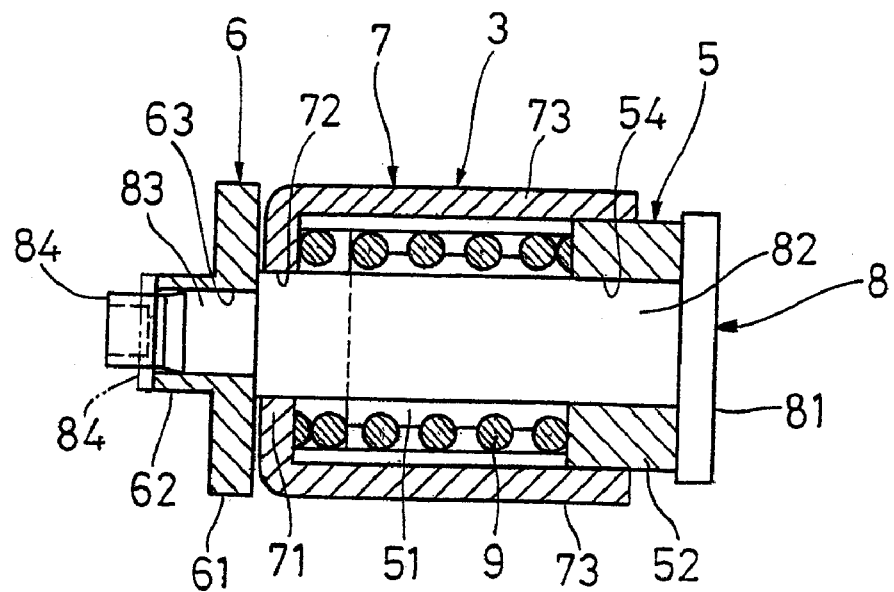

First, a construction capable of achieving the first-mentioned function will be described. As shown in FIGS. 11 to 13, one pair of engagement recesses 101, 101 are formed in that end face of the disc portion 61 which is located on the movable member 7 side. The engagement recesses 101, 101 extend in a radial direction and spacedly arranged at an interval of 180 degrees in a circumferential direction. On the other hand, engagement protrusions 102, 102 are formed on that end face of the end plate portion 71 which is located on the hinge member 6 side and spacedly arranged at an interval of 180 degrees in a circumferential direction. The engagement protrusion 102 has a generally same configuration in section as the engagement recess 101 and is engageable with the engagement recess 101. In a state in which the engagement protrusion 102 is engaged with the engagement recess 101, the hinge member 6 and the movable member 7 are non-pivotably connected to each other by biasing force of the coiled spring 9 with moderation, so that the hinge members 5, 6 are non-pivotably connected to each other through the movable member 7 with moderation. By this, a constant positional relation between the key portion 42 and the engagement piece 45 of the hinge member 5 and the key portion 62 of the hinge member 62 is maintained.

When an angle formed between the telephone main body B and the cover body C is brought to a predetermined angle, particularly, in this embodiment, when the angle is brought to about 170 degrees slightly larger than an angle formed between the telephone main body B and the cover body C in an open position, the positional relation between the key groove 41 and engagement recess 43 and the key groove 11b is set to be same as the positional relation between the key portion 42 and engagement piece 45 and the key portion 62 in a state in which the engagement protrusion 102 is engaged with the engagement recess 101. Owing to this arrangement, the angle formed between the telephone main body B and the cover body C is brought to a predetermined angle and the engagement protrusion portion 102 is brought into engagement with the engagement recess 101. Then, the key portion 42 and the key groove 41 are correctly positioned with respect to each other in that condition. In that state so, when the key body 3 is inserted into the support sleeve portions 21, 11, the key portion 42 and the engagement piece 45 are engaged with the key groove 41 and the engagement recess 43, respectively, and the key portion 62 is engaged with the key groove 11b. Thus, the hinge body 3 can easily be assembled to the support sleeve portions 11, 21.

Next, a construction for achieving the function for holding the cover body C in a closed or open position will be described. As shown in FIG. 12, engagement recesses 103, 104 extending along the engagement recess 101 are formed on opposite sides of the engagement recess 101 such that their one side portions are superimposed with a side portion of the engagement recess 101. The engagement recesses 103, 104 formed on opposite sides of one of the engagement recesses 101 are point symmetric with the engagement recesses 103, 104 which are formed on opposite sides of the other engagement recess 103, 104.

As shown in FIG. 13, when the cover body C is pivoted about 10 degrees in a direction to the closed position (the direction indicated by an arrow X of FIG. 13) from a state in which the engagement protrusions 102, 102 are engaged with the engagement recesses 101, 101 (the angle formed between the telephone main body B and the cover body C is about 170 degrees in that state), the cover body C is brought to the open position. In this open position, one side portions of the engagement protrusions 102, 102 override the side portions of the engagement recesses 103, 103. As a result, the coiled spring 9 biases the cover body C in a direction of the open position side (the direction indicated by an arrow Y of FIG. 13) from the closed position side through the movable member 7 and the hinge member 5. However, the telephone main body B and the cover body C are prohibited from pivoting in the same direction by a stopper portion (not shown) disposed therebetween after completion of assembly. Accordingly, the cover body C is held in the open position.

When the cover body C is pivoted in the direction as indicated by the arrow X into the closed position, the other side portions of the engagement protrusions 102, 102 override the side portions of the engagement recesses 104, 104. As a result, the cover body C is biased to the closed position side (the direction indicated by the arrow X of FIG. 13) from the open position by the coiled spring 9. However, in the closed position, the cover body C hits the telephone main body B and is unable to pivot any further. Accordingly, the cover body C is held in the closed position.

It should be noted that the present invention is not limited to the above-mentioned embodiment and many changes and modifications can be made in accordance with necessity.

For example, in the above embodiment, although the engagement recesses 43 are formed in the support sleeve portions 21, 22 of the cover body C, they may be formed in the support sleeve portions 11, 12 of the telephone main body B.

Although the key portion 42 and the engagement piece 45 are formed at the same location in the circumferential direction, they may be formed at different locations in the circumferential direction.

Moreover, instead of the elastically deformable engagement piece 45, an engagement member may be disposed at the hinge member 5 of the hinge body 3 in such a manner to be able to retractably enter the outer peripheral surface so that this engagement member is biased radially outward of the hinge body 3.

What is claimed is:

1. A hinge assembly comprising a first support sleeve portion and a second support sleeve portion disposed at a device main body and a rotating body respectively with axes thereof aligned and a hinge body having two end portions, the two end portions of said hinge body being inserted into said first support sleeve portion and said second support sleeve portion respectively, thereby pivotably connecting said device main body and said rotating body together, said first support sleeve portion having both ends open, while said second support sleeve portion having a bottom portion and an open end, said hinge body being inserted into said first support sleeve portion from one end portion thereof located away from said second support sleeve portion, passing through said first support sleeve portion, and being inserted into said second sleeve portion, said hinge assembly further comprising an engagement mechanism disposed between an inner peripheral surface of said first support sleeve portion and said hinge body and adapted to prohibit said hinge body from escaping from said first support sleeve portion and said second support sleeve portion in the direction from said second support sleeve portion side to said first support sleeve portion side, said engagement mechanism includes an engagement recess portion formed in the inner peripheral surface of said first support sleeve portion and a totally elastically deformable engagement piece, such that a basal end portion of said engagement piece is integral with said hinge body and a distal end portion thereof is displaceable in a radial direction of said hinge body, the distal end portion of said engagement piece being displaced radially outward so as to be inserted into said engagement recess portion, a distal end surface of said engagement piece is abutted with a side surface of said engagement recess portion which faces in the direction from said first support sleeve portion side to said second support sleeve portion side, thereby said hinge body is prohibited from escaping from said first and second support sleeve portions in the direction from said second support sleeve portion side to said first support sleeve portion side.

2. A hinge assembly according to claim 1, wherein two of the first support sleeve portions are disposed with axes thereof aligned and two of the second support sleeve portions are also disposed with axes thereof aligned said two second support sleeve portions being arranged away from each other in an a axial direction with bottom portions thereof located at an external side of the second support sleeve portions and said two first support sleeve portions being arranged away from each other in an axial direction and adjacent to an internal side of said two second support sleeve portions, two of said hinge bodies being inserted into each of the mutually adjacent two sets of support sleeve portions.

3. A hinge assembly according to claim 1, wherein said device body and said rotating body are a telephone main body and a cover body of a cellular telephone, respectively.

* * * * *

UNITED STATES PATENT AND TRADEMARK OFFICE
CERTIFICATE OF CORRECTION

PATENT NO.    : 6,543,088 B2
DATED         : April 8, 2003
INVENTOR(S)   : Shinichiro Koshikawa It is certified that error appears in the above-identified patent and that said Letters Patent is hereby corrected as shown below:

Drawings,
Sheet 3 of 7, replace Figure 6 with corrected Figure 6 as shown on the attached drawing sheet.

Column 10,
Line 20, after "axes thereof aligned" insert -- , --.

Signed and Sealed this

Sixteenth Day of September, 2003

JAMES E. ROGAN
*Director of the United States Patent and Trademark Office*